Jan. 14, 1936.    A. W. LISSAUER    2,027,542
FILTER BELT FOR ROLLER PRESSES
Filed June 1, 1935
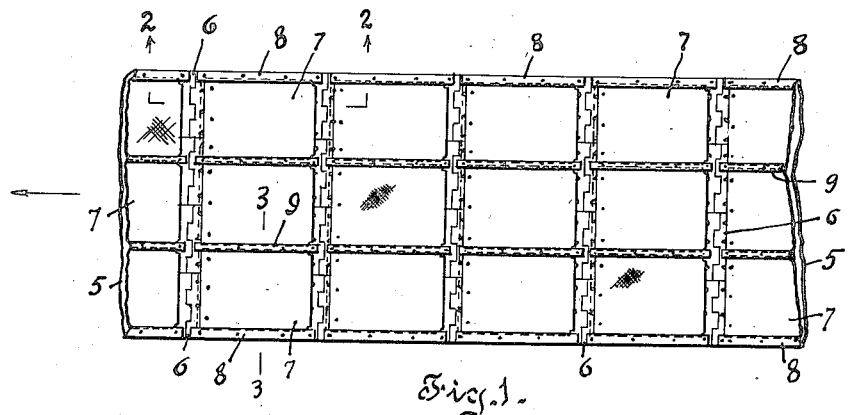
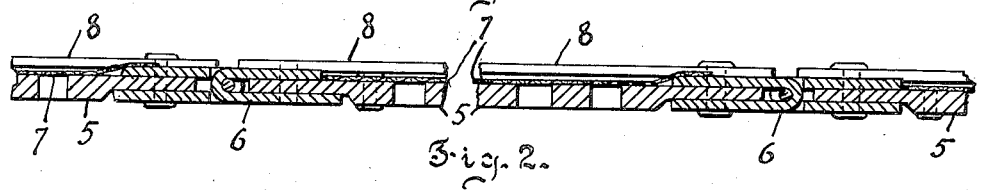
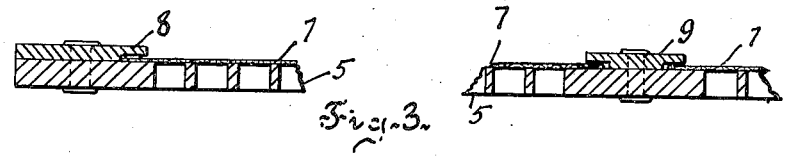
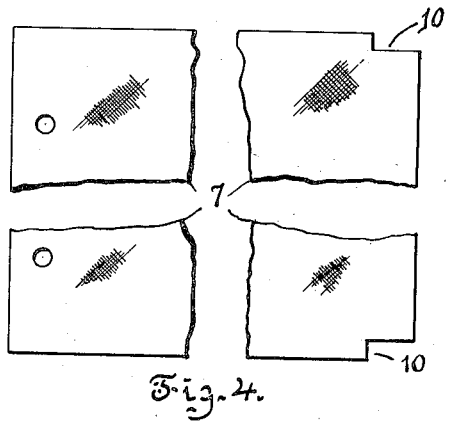
INVENTOR
A. W. Lissauer
BY B. Joffe
his ATTORNEY Patented Jan. 14, 1936

2,027,542

UNITED STATES PATENT OFFICE 2,027,542

FILTER BELT FOR ROLLER PRESSES

Adolph W. Lissauer, Louisville, Ky., assignor to Louisville Drying Machinery Co. Inc., Louisville, Ky.

Application June 1, 1935, Serial No. 24,542

6 Claims. (Cl. 100—35)

My invention relates to a filter belt for roller press and has reference more particularly to the mounting of the fine mesh screen on the perforated plate of a belt section.

The object of the invention is to so mount the fine mesh fabric on the perforated plate that the same will be free to expand longitudinally and laterally.

In the appended drawing forming part of this application, Figure 1 is a plan of filter belt sections embodying my invention.

Figure 2 is an enlarged cross-section on line 2—2, Figure 1.

Figure 3 is an enlarged cross-section on line 3—3, Figure 1, and

Figure 4 is a plan of a fine mesh fabric section, shown in fragments.

A filter belt for roller press is formed into an endless belt by a number of sections hinged together. Each of the sections consists of a perforated plate to which is secured a fine mesh fabric. Hitherto, this fabric has been secured to the plate by rivets at the edges of the plate, as well as on the face of the plate remote from the edges. In consequence of such mounting, the fine mesh screen could not expand under change of temperature or roller pressure, and therefore, after a certain time of use, the fine mesh fabric screen formed ridges which finally wore through, thereby tearing the screen fabric. To obviate this defect, I so mount the fine mesh fabric screen on the perforated plate that it is free to expand both longitudinally and laterally, thus increasing the life of the belt and reducing maintenance costs of the press.

Referring to the drawing, 5 are perforated plates which are rabbeted at the advancing and following sides or ends of said plates. At the rabbeted ends, hinges 6 are provided to link the adjacent plates 5 into an endless belt.

Mounted on each plate is a plurality of fine mesh screen sections 7, each secured to the plate in proximity to the advancing end of said plate. The said sections are secured along their edges extending between the advancing and the following ends of the plate 5 by strips 8 and intermediate strips 9. Each of said strips 8 and 9 is rabbeted, as best seen in Figure 3, to prevent said sections from rising off the plate 5, although they are free to expand longitudinally as well as laterally.

The said screen sections 7 have their following corners notched, as shown by 10 in Figure 4, so that the following end of the screen section 7 is overlapping the adjacent plate of the hinge which connects the plate that carries the section to the adjacent plate. In other words, the following end of the screen section 7 is not tied down to the plate by any means directly.

From the above description, it will be seen that each section of the endless belt, of the type referred to in my particular structure, comprises a perforated plate to the advancing end of which are positively secured one edge of each of the sections of the fine mesh fabric, and in addition, each of said sections is further secured by means running from the advancing to the following ends of the perforated plate, so that each section can independently expand longitudinally and laterally.

I claim

1. In a filter belt of the class described, a plurality of hinged sections, each section comprising a perforated plate, a fine screen mesh secured at one edge to the advancing end of said plate, and means securing said screen between the advancing and following ends of the plates, so that the screen may freely expand longitudinally and laterally.

2. In a filter belt of the class described, a plurality of hinged sections, each section comprising a perforated plate, fine mesh screen sections, each secured at one edge to the advancing end of the plate, and means securing each of said screen sections between the advancing and following ends of the plates, so that each screen section may freely expand longitudinally and laterally.

3. In a filter belt of the class described, a plurality of hinged sections, each section comprising a perforated plate, fine mesh screen sections secured at one edge to the advancing end of said plate, and means spacing said sections between the advancing and following ends of said plate, said spacing means securing said screen sections to said plate so that the same are free to expand longitudinally and laterally but prevented from rising therefrom.

4. In a filter belt of the class described, a plurality of hinged sections, each section comprising a perforated plate, fine mesh screen sections on said plate and secured thereto at one edge to the advancing end of said plate, and rabbeted strips carried by said plate between the advancing and following ends thereof, said rabbeted parts of said strips engaging the edges of said screen sections extending between the advancing and following ends of said plate.

5. In a filter belt of the class described, a plurality of hinged sections, each section comprising a perforated plate, facing rabbeted strips on the plate running in the directon of the belt motion and a fine mesh screen having certain edges thereof engaging the rabbets of the strips, one of the other edges of said screen being secured to the plate.

6. In a filter belt of the class described, a plurality of hinged sections, each section comprising a perforated plate, a rectangular fine mesh screen secured at one edge to the plate, the opposite edge of said screen having its extremities set back to form notched out corners, and rabbeted means on the plate, the rabbets thereof engaging the edges of the screen between the secured edge and notched out corners.

ADOLPH W. LISSAUER.